United States Patent [19]

Cunningham et al.

[11] Patent Number: 4,461,510

[45] Date of Patent: Jul. 24, 1984

[54] CHILDS SAFETY DEVICE FOR VEHICLES

[75] Inventors: Douglas J. Cunningham, Lutterworth; Harry W. Gilkes, Coventry, both of England

[73] Assignee: Britax-Excelsior Limited, England

[21] Appl. No.: 381,839

[22] Filed: May 25, 1982

[30] Foreign Application Priority Data

May 29, 1981 [GB] United Kingdom ............... 8116544

[51] Int. Cl.³ .................. B60N 1/12; B60R 21/10; A62B 35/00
[52] U.S. Cl. ................... 297/250; 297/216; 297/464; 297/483
[58] Field of Search ............ 297/250, 216, 464, 479, 297/473, 254, 483, 468

[56] References Cited

U.S. PATENT DOCUMENTS

| | | | |
|---|---|---|---|
| 3,136,579 | 6/1964 | Hunter | 297/250 |
| 3,547,489 | 12/1970 | Grieser | 297/250 X |
| 3,606,453 | 9/1971 | Cicero | 297/254 |
| 3,794,379 | 2/1974 | Furey | 297/250 |
| 4,275,923 | 6/1981 | Molnar | 297/250 |
| 4,289,352 | 9/1981 | Ashworth | 297/473 |
| 4,291,915 | 9/1981 | Cox | 297/250 X |
| 4,342,483 | 8/1982 | Takada | 297/216 X |

FOREIGN PATENT DOCUMENTS

| | | | |
|---|---|---|---|
| 2917207 | 11/1979 | Fed. Rep. of Germany | 294/464 |
| 2072003 | 3/1980 | United Kingdom | 297/216 |

Primary Examiner—William E. Lyddane
Assistant Examiner—Thomas A. Rendos
Attorney, Agent, or Firm—Hayes, Davis & Soloway

[57] ABSTRACT

A safety device for enabling a child to use an adult vehicle safety belt of the type having a shoulder strap and a lap strap consists of a cushion (50) having a respective belt retainer (54, 56) on each side thereof, under which the lap strap of the adult safety belt engages. An auxiliary strap (14) is attached to the cushion so as to extend from the back thereof and has a belt guide connector (18) secured to its free end. In use, the belt guide connector slidably receives the shoulder strap of the adult belt so that the shoulder strap extends in front of, and the auxiliary strap extends behind the child's torso with the belt guide connector located above the child's shoulder.

3 Claims, 6 Drawing Figures

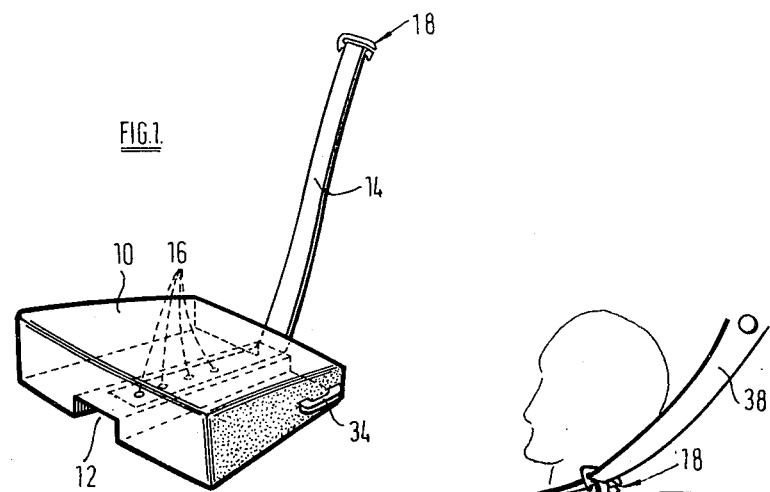
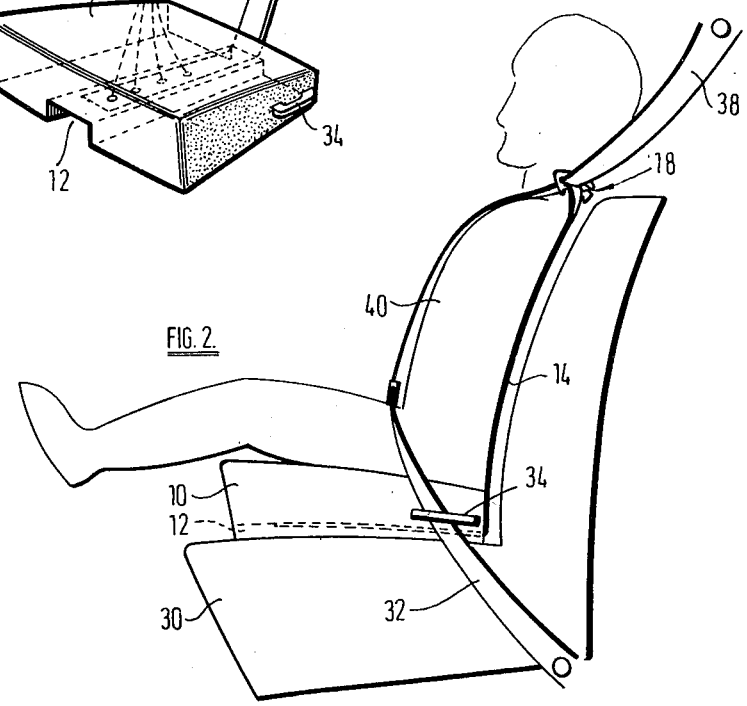
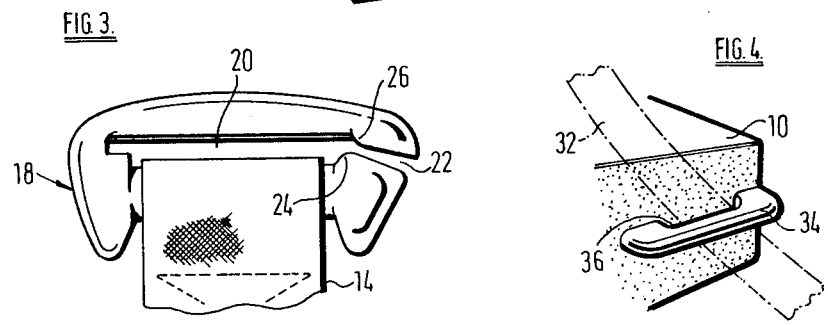
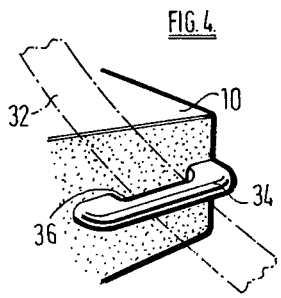

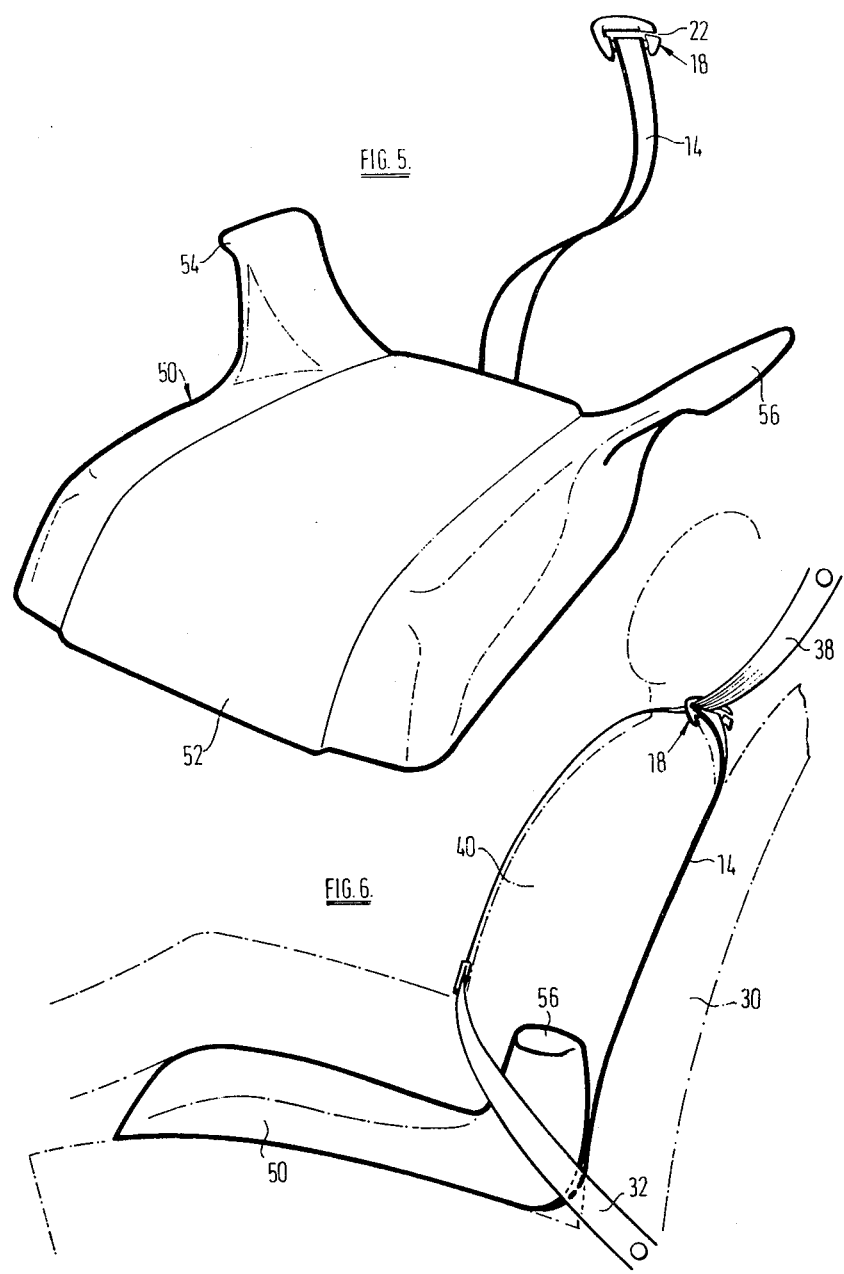

CHILDS SAFETY DEVICE FOR VEHICLES

This invention relates to childs' safety devices for use in vehicles and more particularly to devices for enabling a child to use an adult safety belt.

U.S. Pat. No. 3,136,579 discloses a device of this type in the form of a detachable cushion adapted to be positioned on the horizontal cushion of a vehicle seat and provided with a respective belt guide on each side for engagement with an adult lap belt. The lap of a child seated on such a detachable cushion is thereby raised to at least as great a height above the vehicle seat as that of the lap of an adult occupant of the vehicle seat. The engagement of the belt guides with the lap belt prevents the cushion from being ejected from under the child on sudden deceleration of the vehicle. Devices of this type are commonly called "booster cushions".

While booster cushions enable a child to use an adult lap belt, and also have the incidental advantage of raising the child on the vehicle seat so as to enable him to more easily see out through the vehicle windows, and thus reduce boredom on long journeys, they can be satisfactorily used with adult three-point belts only if the child is tall enough for the booster cushion to raise his shoulder to the level of that of an adult seat occupant. With a smaller child, there is nothing to ensure that the diagonal element of the safety belt remains correctly positioned on the child's shoulders or to prevent the child from slipping out of the diagonal element during sudden deceleration.

An arrangement enabling a child to use an adult three-point safety belt is disclosed in G.B. Patent Specification No. 2015321. This arrangement consists of an auxiliary strap which extends generally upright on the seat back between the outboard anchorage for the lap belt and the anchorage for the diagonal belt. The auxiliary strap carries a belt guide which can be moved to any desired position thereon and through which the diagonal belt is threaded. The position of the belt guide on the auxiliary strap thus determines the effective position from which the upper end of the diagonal strap extends. In use, the belt guide is positioned approximately at the level of the seat occupant's shoulder. This arrangement suffers from the disadvantage that the auxiliary strap has to be installed at the same time as the adult safety belt with which it is to be used and then remains permanently fitted. It cannot readily be moved from seat to seat or from vehicle to vehicle.

It is an object of the present invention to provide a booster cushion suitable for use with an adult safety belt having a shoulder strap, for example, a three-point belt.

According to the invention, a safety device, for enabling a child to use an adult vehicle safety belt having a shoulder strap and a lap strap, comprises a cushion having a respective belt retainer on each side thereof, to enable the lap strap to inhibit forward movement of the cushion, an auxiliary strap attached to the cushion so as to extend from the back thereof and a belt guide connector secured to the free end of the auxiliary strap, whereby when the cushion is disposed on a vehicle seat, each side of the lap strap is engagable in a respective belt retainer to retain the cushion against forward movement, and the shoulder strap is slidably received in the belt guide connector so that, in use, the shoulder strap extends in front of and the auxiliary strap extends behind the user's torso with the belt guide connector located above the user's shoulder.

An embodiment of the invention will now be described by way of example, with reference to the accompanying drawings, in which:

FIG. 1 is a perspective view of a booster cushion and auxiliary strap in accordance with the invention, FIG. 2 is a side view showing the device illustrated in FIG. 1, in use on a vehicle seat;

FIG. 3 is a front view of an enlarged scale of a belt guide connector fitted to the free end of the auxiliary strap of the device shown in FIG. 1;

FIG. 4 is a fragmentary perspective view of an enlarged scale of one of the rear corners of the booster cushion of the device shown in FIG. 1, illustrating the corresponding belt guide;

FIG. 5 is a perspective view of another booster cushion and auxiliary strap in accordance with the invention;

FIG. 6 is a side view showing the device illustrated in FIG. 1 in use on a vehicle seat.

Referring to FIGS. 1 to 4, a child's safety device in accordance with the invention consists of a booster cusion 10, having a recess 12 in its bottom surface, the recess 12 extending along the centre line of the cushion from the front to the back thereof. An auxiliary strap 14 projects from the rear end of the slot 12. A peg (not shown), projecting downwardly from the cushion 10 near the front of the slot 12 can engage in one of a series of holes 16 in the auxiliary strap 14, so as to very the effective length of the latter. On its free end, the auxiliary strap 14 carries a belt guide connector 18, which, as can most clearly be seen from FIG. 3, has an open ended slot 20 for receiving the diagonal element of an adult safety belt (not shown in FIG. 3). The open end 22 of the slot 20 has a flared mouth, to facilitate connection to the adult safety belt, and shoulders 24 and 26, reducing the width of the inner end of the flared mouth relative to the rest of the slot 20, so as to inhibit accidental detachment.

Referring now particularly to FIG. 2, the booster cushion 10 is, in use, positioned on a vehicle seat 30 with the side portions of the lap element 32 of an adult three-point safety belt engaged in a belt retainer 34, near one of the rear corners of the cushion 10 and a similar belt retainer (not shown) near the other rear corner. As can be seen from FIG. 4, the belt retainer 34 is connected to the cushion 10 at its rear end and defines a slot 36 at its front end, through which lap element 32 can be inserted and removed. The diagonal element 38 of the adult belt is inserted into the slot 20 in the belt guide connector 18 on the end of the auxiliary strap 14.

When a child 40 is to use the device, the length of the auxiliary strap 14 is adjusted, using the above-mentioned peg (not shown) and the holes 16 so that the belt guide connector 18 is located just above the child's shoulder. The adult safety belt is then fastened in the normal way, the auxiliary strap 14 and belt guide connector 18 ensure that the diagonal element 38 is correctly positioned.

When the seat 30 is to be occupied by an adult, it is a simple matter to detach the lap element 32 from the belt retainers 34 and the diagonal element 38 from the belt guide connector 18. The child's safety device can them be stored in the car boot or, if desired, fitted to another vehicle.

FIGS. 5 and 6 illustrate another child's safety device in accordance with the invention, consisting of a booster cushion 50, the main structure of which can be formed as a one-piece moulding. The cushion 50 has a longitudinally extending central recess in its front and upper surfaces for receiving an upholstered pad 52 of resilient foam material. The belt retainers 34 of the booster cushion 10 shown in FIGS. 1 to 4 are replaced by a pair of outwardly inclined projections 54 and 56 extending upwardly from the rear top corners of the cushion 10. In all other respects the device shown in FIGS. 5 and 6 is the same as the device shown in FIGS. 1 to 4 and the same reference numerals are used for corresponding parts. The connection of the auxiliary strap 14 to the cushion 50 is effected in a similar manner but the front end of the recess 12 is covered by the pad 52.

We claim:

1. A safety device for enabling a child to use an adult vehicle safety belt having a shoulder strap (38) and a lap strap (32), comprising a cushion (10, 50) having a respective belt retainer (34, 54, 56) on each side thereof to enable the lap strap (32) to inhibit forward movement of the cushion (10, 50), characterised by an auxiliary strap (14) attached to the cushion (10, 50) so as to extend from the back thereof and a belt guide connector (18) secured to the free end of the auxiliary strap (14), whereby when the cushion (10, 50) is disposed on a vehicle seat, each side of the lap strap (32) is engagable in a respective belt retainer (34, 54, 56) to retain the cushion against forward movement, and the shoulder strap (38) is slidably received in the belt guide connector (18) so that, in use, the shoulder strap (38) extends in front of and the auxiliary strap (14) extends behind the user's torso with the belt guide connector (18) located above the user's shoulder.

2. A safety device according to claim 1, characterised in that the belt guide connector (18) comprises a pair of spaced parallel bars interconnected at one end and having a slot (22) therebetween at the other end, through which slot (22) the shoulder strap can be inserted, the auxiliary strap (14) being connected to one of said bars.

3. A safety device according to claim 1 or 2, characterised in that the attachment of the auxiliary strap (14) to the cushion (10, 50) is arranged to permit adjustment of the effective length of the auxiliary strap (14).

* * * * *